United States Patent Office 3,458,278
Patented July 29, 1969

3,458,278
METHOD OF SEPARATELY OBTAINING SODIUM CARBONATE AND SODIUM CHROMATE FROM SOLUTIONS OBTAINED BY LEACHING ROASTED LATERITES AND THE LIKE
Georges Bonnivard, Metz, Moselle, France, assignor to Institut de Recherches de la Siderurgie Francaise, Saint Germain-en-Laye, Yvelines, and Bureau de Recherches Geologiques et Minieres, Paris, France
No Drawing. Filed May 23, 1966, Ser. No. 551,927
Claims priority, application France, June 11, 1965, 20,356
Int. Cl. C01g 37/14, 7/00
U.S. Cl. 23—56                                8 Claims

ABSTRACT OF THE DISCLOSURE

Sodium carbonate and sodium chromate are recovered from an aqueous solution, particularly the washing solution employed in the lixiviation of iron containing minerals such as laterites, by evaporating the water of the solution so as to obtain a solid residue consisting substantially of a mixture of sodium carbonate and sodium chromate; then treating the residue with an alcohol, preferably methanol to dissolve the sodium chromate while the sodium carbonate remains substantially undissolved; then filtering the alcoholic solution to recover the undissolved sodium carbonate and evaporating thereafter the alcohol to recover the sodium chromate. Preceding these steps the solution may also be subjected to a bubbling through with carbon dioxide to precipitate the sodium aluminate, that may be present in the solution, in the form of aluminum hydroxide and then separating the precipitate from the solution.

---

The present invention relates to a method of separately recovering sodium carbonate and chromium compounds from solutions thereof and, more particularly, the present invention is concerned with treating spent washing solutions obtained by leaching laterites or the like after alkaline roasting of the latter.

Laterites are iron-containing minerals which generally also contain bound aluminum, chromium and also small proportions of nickel and cobalt.

It is possible to separate chromium from the remainder of the laterite by various processes of which the best known and most important consists in subjecting a mixture of the mineral and of sodium carbonate to roasting at temperatures between 900 and 1200° C., whereby sodium chromate is formed of the chromium content of the laterite. This roasting process is generally known as "alkaline roasting" of the laterite or the like.

The thus roasted laterite or the like is then subjected to leaching, whereby the soluble chromate will be dissolved in the latching liquid or washing water. In addition, the spent washing water will contain sodium aluminate formed by the reaction of the aluminum of the laterite with sodium carbonate during the roasting process.

It is one of the objects of the present invention to recover separately the chromium and aluminum content of the washing water in the form of marketable products.

It is another object of the present invention to recover the sodium carbonate content of the washing water so that the same may be reused as the alkaline reactant for the alkaline roasting of subsequent portions of laterite or the like.

Other objects and advantages of the present invention will become apparent from a further reading of the description and of the appended claims.

With the above and other objects in view, the present invention contemplates a method of separately recovering sodium carbonate as a first component and a chromium compound as a second component from an aqueous solution of sodium carbonate and a water soluble chromium compound, comprising the steps of evaporating the aqueous solution so as to obtain an at least substantially dry residue consisting essentially of a mixture of sodium carbonate and the water soluble chromium compound, treating the residue with a solvent in which only one of the components is soluble so as to dissolve the one component while the other of the components remains substantially undissolved, separating the thus formed solution of the dissolved component from the substantially undissolved component, and recovering the dissolved component from the solution thereof.

The aqueous solution which is thus treated may be formed by alkaline roasting of an aluminum and chromium-containing iron ore such as laterite and the like in the presence of sodium carbonate, leaching of the thus obtained roasted product containing sodium carbonate, sodium chromate and sodium aluminate with an aqueous liquid so as to obtain an aqueous solution of sodium carbonate, sodium aluminate and sodium chromate, converting the sodium aluminate into a precipitate of aluminum hydroxide, and separating the precipitate from the residual sodium chromate and sodium carbonate-containing aqueous solution.

Thus, the present invention is concerned with the treating of the spent washing water obtained by leaching laterites after the same have been subjected to alkaline roasting, which treatment comprises bubbling a carbon dioxide-containing gas through the spent washing water in order to transform the sodium aluminate dissolved therein into aluminum hydroxide and sodium carbonate, separating by filtration the thus precipitated aluminum hydroxide from the residual liquid, and evaporating the thus obtained aluminum-free filtrate to dryness in order to obtain a residue which contains chromium and sodium carbonate. According to the present invention, the thus formed dry residue is subjected to a selective dissolution by means of a washing process which will result in separate recovery of a chromium compound and soidum carbonate. At least one of these compounds is separated in the form of a solution thereof which is then dried by evaporation of the solvent.

According to one embodiment of the present invention, the chromium is recovered as sodium chromate by subjecting the solid residue consisting essentially of the sodium chromate and the sodium carbonate to leaching with an aqueous methanol solution containing at least 60% by volume of methanol. The sodium chromate will be dissolved in the aqueous methanol solution, whereas the sodium carbonate will remain in solid state so that it may be separated from the thus formed solution of sodium chromate by conventional filtration processes. The thus obtained filtrate, i.e., the solution of sodium chromate in aqueous methanol is then evaporated to dryness in order to recover solid sodium chromate.

According to a second embodiment of the present invention, the chromium is recovered as chromium oxide ($Cr_2O_3$) by treating at a temperature of between 500 and 800° C. the sodium chromate and sodium carbonate-containing solid residue of the above described leaching process with a reducing gas preferably including carbon monoxide and carbon dioxide, so as to decompose the sodium chromate of the residue under formation of chromium oxide and sodium carbonate, followed by washing or leaching with water in order to dissolve the sodium carbonate. The thus formed aqueous sodium carbonate solution is then separated by filtration from the water-insoluble chromium oxide and thereafter evaporated to dryness in order to recover solid sodium carbonate.

The present invention, which has been broadly described above, may also include, in combination with the foregoing, one or more of the following features:

(a) The use of the hot fumes formed during the alkaline roasting of the laterites as the carbon dioxide containing gas which is bubbled through the spent washing water or leaching liquid in the first step of the treatment thereof;

(b) The aluminum hydrate which is precipitated and separated from the washing water by filtration may be calcined at a temperature above 950° C. in order to form aluminum oxide thereof;

(c) The aqueous methanol which is applied in accordance with the first described embodiment of the present invention preferably consists of about 30% by volume of water and 70% by volume of methanol;

(d) The evaporated aqueous methanol of the last step of the process according to the first described embodiment may be condensed for recovery of the methanol which then may be recycled for the dissolution of subsequent portions of the sodium chromate and sodium carbonate residue;

(e) The recovered sodium carbonate may be recycled, without being subjected to any further treatment, for use in the alkaline roasting of subsequent portions of laterite;

(f) In the second embodiment of the process which has been described above, the carbon monoxide and carbon dioxide-containing gas preferably will be of the following composition: about 20% by volume CO, about 20% by volume $CO_2$, and about 60% by volume $N_2$.

It will be understood that the present invention is concerned with a process of treating the spent washing water obtained by leaching laterites after the same were subjected to alkaline roasting.

Preferably, these spent washing waters are obtained by leaching the roasted laterites under a partial vacuum by immersing in the washing water pellets formed of laterite which had been subjected to alkaline roasting. These pellets will consist partly of chromate and sodium aluminate. A partial vacuum is applied above the level of the liquid to enhance penetration of the liquid into the pores of the pellets and thereby the leaching of chromium and aluminum compounds from the remainder of the pellets. This is followed by reestablishing atmospheric pressure in order to increase the intensity of surface contact between the solid and liquid phases in the pores of the pellets, resulting in effective extraction of the chromate and the aluminate which are thus dissolved in the leaching liquid or washing water. It will be understood that different types of washing liquids which were used for leaching chromates and aluminates from laterites after alkaline roasting of the latter may be further treated in accordance with the present invention.

A method of obtaining the spent washing liquid which is further treated in accordance with the present invention is more fully described in my copending application Ser. No. 539,781, filed Apr. 4, 1966, and entitled, "Method of Treating Laterites."

It is one of the advantages of the present invention that it is possible to recover as desired, for instance in accordance with the specific commercial demand at any given time, the chromium either as sodium chromate ($Na_2CrO_4$) which is used in the chemical industry, or as chromium oxide ($Cr_2O_3$) which is used in the production of certain types of steel.

It is another advantage of the present invention that the chromium and aluminum content of the ore as well as the sodium carbonate are recovered in a very high yield, generally between about 98 and 99%, whereby the recovered sodium carbonate may be recycled for use in the alkaline roasting of subsequent portions of laterite or the like.

Another advantage of the present process will be found in the high purity of the recovered products which, in the case of sodium chromate is equal to about 99%.

The reactants which are introduced in accordance with the present invention (sodium carbonate and methanol) can be, and generally are, recycled and thereby the costs of the process are kept very low. Furthermore, in accordance with the second embodiment of the process described above, the impurities which may be contained in the recovered carbonate do not interfere with the recycling of the sodium carbonate in a continuation of the process, since these impurities consist substantially only of residual sodium chromate which is then reintroduced into the process upon recycling of the carbonate for the alkaline roasting of subsequent portions of laterite or the like, and eventually will be recovered.

The following examples are given as illustrative only without, however, limiting the invention to the specific details of the examples.

EXAMPLE I

This example deals with the recovery of chromium in the form of crystals of sodium chromate.

A solution obtained by leaching under vacuum pellets of laterite which had been subjected to alkaline roasting, formed as described in more detail in my copending application referred to above, and containing per cubic meter of solution 90 kg. of sodium chromate and 50 kg. of sodium aluminate, is alkalized by adding 10 kg. of sodium hydroxide per cubic meter of solution, in order to prevent premature hydrolysis of the sodium aluminate.

Thereafter, while maintaining the solution at 70° C., fumes formed in the roasting furnace during the alkaline roasting of the laterite are bubbled through the solution. The composition of these fumes may be as follows: $CO_2$: 15%, $O_2$: 5%, $N_2$: 80%. Thereby, the aluminum is precipitated in accordance with the following equation:

(1) 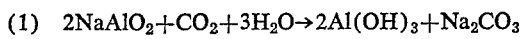  $2NaAlO_2 + CO_2 + 3H_2O \rightarrow 2Al(OH)_3 + Na_2CO_3$

The thus precipitated aluminum hydroxide is filtered, washed and then calcined at 1200° C. In this manner aluminum oxide ($Al_2O_3$) is obtained in a very high yield. Generally at least 97% of the aluminum of the solution are recovered in this manner.

During the hydrolyzation of the sodium aluminate, a significant proportion of the sodium carbonate is transformed into bicarbonate in accordance with the following equation:

(2) 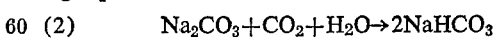 $Na_2CO_3 + CO_2 + H_2O \rightarrow 2NaHCO_3$

The thus formed bicarbonate will be reconverted into carbonate during the following process step.

The thus obtained filtrate consisting of an aqueous solution containing substantially only the chromate, carbonate and bicarbonate of sodium, is evaporated to dryness at about 120° C, under simultaneous conversion of the bicarbonate to carbonate. In this manner, a yellow powder is obtained which consists essentially of a mixture of sodium carbonate and sodium chromate.

The sodium chromate is then selectively dissolved in a solvent consisting of a mixture of 70% by volume of methanol and 30% by volume of water. The dissolution of the sodium chromate is carried out at ambient temperature. Under these conditions, the chromate is highly soluble (150 g./l.) whereas the solubility of the carbonate is negligible (less than 0.2 g./l.)

It should be understood that the solvent must contain at least about 60% by volume of methanol. While it has been found preferable to use as solvent an aqueous methanol solution containing about 70% by volume of methanol, it is also possible to use aqueous methanol of higher methanol concentration or even pure methanol, and it is also possible to replace the methanol with ethanol, although in the latter case the dissolution of the sodium chromate will proceed more slowly.

The undissolved residue contains substantially the entire sodium carbonate which is thus also recovered and may be reused in the alkaline roasting of subsequent portions of laterite, even though the thus obtained sodium carbonate includes as impurity a small proportion of sodium chromate, since the latter will be recovered during the working up of subsequently roasted laterite.

The filtrate is evaporated to dryness and thereby crystals of anhydrous sodium chromate of high commercial quality, having a purity of about 99%, will be obtained. The vapors formed during evaporation of the filtrate comprise the methanol or ethanol of the aqueous alcoholic solvent and, upon condensation, will yield the liquid alcohol which may then be recycled for the dissolution of sodium chromate from subsequent portions of the residue of the leaching process.

The method of the present invention as described above, is much more simple and efficient than the conventional method of fractional crystallization of solutions containing sodium chromate and sodium carbonate.

EXAMPLE II

This example will deal with the recovery of chromium in the form of chromium oxide ($Cr_2O_3$).

The first portion of the process is carried out in the same manner as described in the preceding example, namely, by leaching pellets of laterite, which had been previously subjected to alkaline roasting, so as to form a solution which contains per cubic meter about 90 kg. of sodium chromate and about 50 kg. of sodium carbonate. This solution is then alkalized by the introduction of 10 kg. of NaOH per cubic meter of solution.

The aluminum hydroxide is then precipitated as described in Example I, by bubbling through the solution maintained at about 70° C. the fumes emanating from the furnace in which the alkaline roasting of the laterite is carried out. The thus formed aluminum hydroxide is then separated and calcined at 1200° C. to form aluminum oxide. The residual solution will again contain sodium chromate, sodium carbonate and sodium bicarbonate. The solution is evaporated at 120° C., under simultaneous conversion of the bicarbonate into sodium carbonate. In this manner, as described in Example I, a yellow powder is obtained.

The thus obtained yellow powder is treated at a temperature of between 600 and 650° C. with a reducing gas preferably containing about 20% by volume of carbon monoxide, 20% by volume of carbon dioxide and 60% by volume of nitrogen. Preferably, the reducing treatment is carried out in a rotating furnace, however, it may also be advantageously carried out as a fluidized bed process, since the particles of the yellow powder generally will have a size of between about 0.2 and 1 mm. and are well suited for fluidization. The reducing reaction proceeds in accordance with the following equation:

(3) 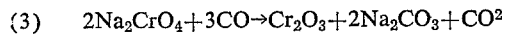$2Na_2CrO_4 + 3CO \rightarrow Cr_2O_3 + 2Na_2CO_3 + CO^2$

The chromate is very quickly and easily reduced at temperatures above 500° C., and generally the temperature should not be higher than 800° C., in order to avoid melting or fusing of the charge.

The thus reductively roasted charge is of greenish color. It consists of a mixture of $Cr_2O_3$ and $Na_2CO_3$. This mixture is washed with water having a temperature of 80° C. Since the solubility of sodium carbonate in hot water is about 400 g./l., the same will be dissolved, whereas the chromium oxide remains completely insoluble. After careful washing of the undissolved residue the same will consist of $Cr_2O_3$ of 99% purity. The spent washing water will contain about 300 kg. of $Na_2CO_3$ per cubic meter. It also contains, among others, traces of residual aluminate and chromate, for instance 0.5 kg. of sodium chromate and 3 kg. of sodium aluminate per cubic meter, which impurities respectively did not react during the preceding reduction and precipitation steps.

Upon evaporation of the thus obtained spent washing water, sodium carbonate of 98% purity and containing traces of sodium chromate and sodium aluminate is obtained. These impurities do not cause any difficulties since it is intended to recycle the thus recovered sodium carbonate, i.e., to use it for the alkaline roasting of subsequent portions of laterite. During the repetition of the process, these impurities are again dissolved and thus do not accumulate or further reduce the purity of the sodium carbonate during repeated recycling of the latter.

It is to be noted that the reduction of sodium chromate between 500° C. and 800° C. may be obtained by means of any reducing gas, said gas being pure or mixed with other reducing or neutral gases. For instance it is possible to use mixtures containing 5 to 100% CO or 5 to 100% H, the other elements being $CO_2$ or nitrogen or steam on occasion.

It has been stated that the laterite additionally contains small proportions of nickel and cobalt. These two metals are not etched during the alkaline roasting and not dissolved during the leaching and they are recovered integrally in the pellets. When the total content of both elements is less than 1% they are not extracted and will be reduced together with iron in the blast furnace for instance. When the total content of both elements is more than 1%, they are extracted together from the pellets by known processes such as sulfating roasting (described in co-pending application No. 539,781) or ammoniacal lixiviation. The nickel and cobalt are separated by other known processes such as selectively dissolving nickel in an ammoniacal carbonated solution having a low $CO_2$ content.

Wtihout further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. The process of separately obtaining sodium carbonate and sodium chromate from an aqueous solution containing sodium chromate together with sodium carbonates comprising evaporating the water of said solution, thus obtaining a solid residue consisting substantially of a mixture of sodium carbonate and sodium chromate; then treating the residue with methanol or ethanol, thereby dissolving the sodium chromate while the sodium carbonate remains substantially undissolved; then filtering the alcoholic solution to recover the undissolved sodium carbonate and evaporating the alcohol to recover the sodium chromate.

2. The process of claim 1 wherein the aqueous solution contains sodium aluminate in addition to said sodium chromate and sodium carbonates, the said process including the step of bubbling $CO_2$ through the aqueous solution prior to said evaporation of the water, the said carbonation causing the aluminum of said sodium aluminate to precipitate as aluminum hydroxide; then separating the aluminum hydroxide from the solution whereupon the solution is then subjected to said evaporation step and treatment of the residue with alcohol to recover the sodium carbonate and sodium chromate.

3. The process of claim 2 wherein the said aqueous solution is the washing liquid used in the lixiviation of a chromium and aluminum containing iron mineral which previously had been subjected to an alkaline roasting.

4. The process of claim 3 wherein the iron mineral is a laterite.

5. The process of claim 1 wherein the alcohol in the alcoholic solution is methanol and contains a maximum of 40 volume percent of water.

6. The process of claim 1 wherein the alcohol is methanol and the solution contains about 70 volume percent of pure methanol and about 30 volume percent of water.

7. The process of claim 1 wherein the said alcohol is recovered after said evaporation by condensation from the evaporated solvent and is recycled for further use in the process.

8. The process of claim 2 wherein the said aqueous solution is the washing liquid used in the lixiviation of a chromium and aluminum containing iron mineral which previously had been subjected to an alkaline roasting and wherein the recovered sodium carbonate is recycled for further use in the said alkaline roasting of the iron mineral.

References Cited
UNITED STATES PATENTS

| | | | |
|---|---|---|---|
| 2,316,330 | 4/1943 | Hawk | 23—56 X |
| 3,219,434 | 11/1965 | Globus | 23—56 X |
| 1,324,328 | 12/1919 | Vis | 23—56 |
| 1,760,788 | 5/1930 | Specketer et al. | 23—56 |
| 2,409,428 | 10/1946 | Gardner | 23—56 |
| 2,587,552 | 2/1952 | Vedensky | 23—56 |

HERBERT T. CARTER, Primary Examiner

U.S. Cl. X.R.

23—63, 143, 145